United States Patent [19]

Kimoto

[11] Patent Number: 5,761,575
[45] Date of Patent: Jun. 2, 1998

[54] ELECTRICAL APPARATUS HAVING A PLURALITY OF ELEMENTS DIFFERENT IN STARTING PERIOD

[75] Inventor: Taizo Kimoto, Tokyo, Japan

[73] Assignee: Kabushiki Kaisha Toshiba, Kanagawa-ken, Japan

[21] Appl. No.: 732,904

[22] Filed: Oct. 17, 1996

[30] Foreign Application Priority Data

Nov. 29, 1995 [JP] Japan ................ 7-310611

[51] Int. Cl.$^6$ ................................. G03G 15/20
[52] U.S. Cl. ................. 399/70; 399/51; 399/38; 219/216
[58] Field of Search ................. 399/70, 69, 51, 399/328, 330, 335, 38; 219/216; 432/60

[56] References Cited

U.S. PATENT DOCUMENTS 5,321,479  6/1994  Yoshida et al. .
5,589,923  12/1996  Lee et al. ........................ 399/28

FOREIGN PATENT DOCUMENTS 62-7548  2/1987  Japan .

*Primary Examiner*—R. L. Moses
*Attorney, Agent, or Firm*—Limbach & Limbach L.L.P.

[57] ABSTRACT

Time data required for an exposing lamp to reach to a standby temperature value from the starting of the exposing lamp heater with a rated current, and time data required for a heat roller to reach to the standby temperature from the starting of the heater lamp of the fixing apparatus with a rated current are retained in a ROM. The temperature of the heat roller and of the exposing lamp is detected when the power-save mode releasing has been instructed by the key. The start beginning timing of the exposing lamp heater and of the heater lamp is controlled so that the temperature of the exposing lamp and of the heat roller may become a standby state at substantially the same time from the time data retained based on the detected temperature value.

10 Claims, 12 Drawing Sheets

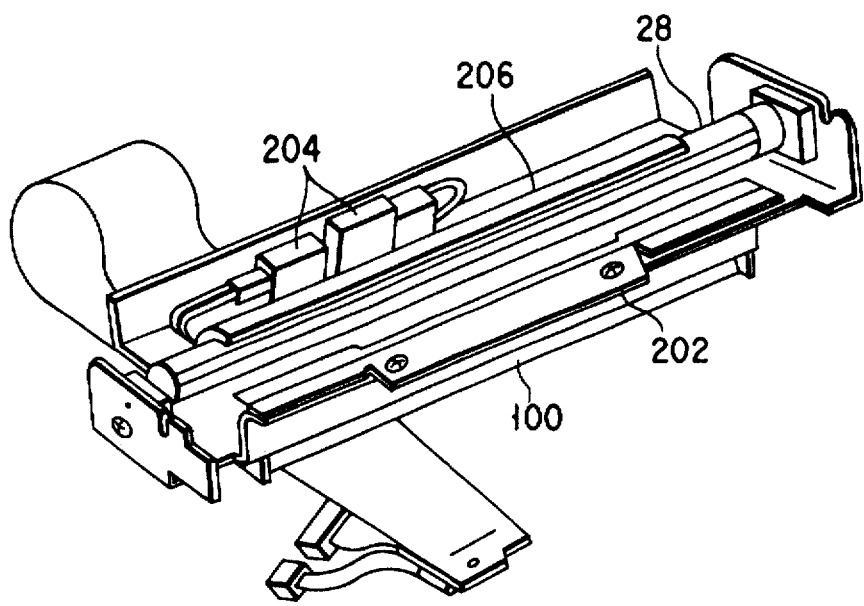
F I G. 2
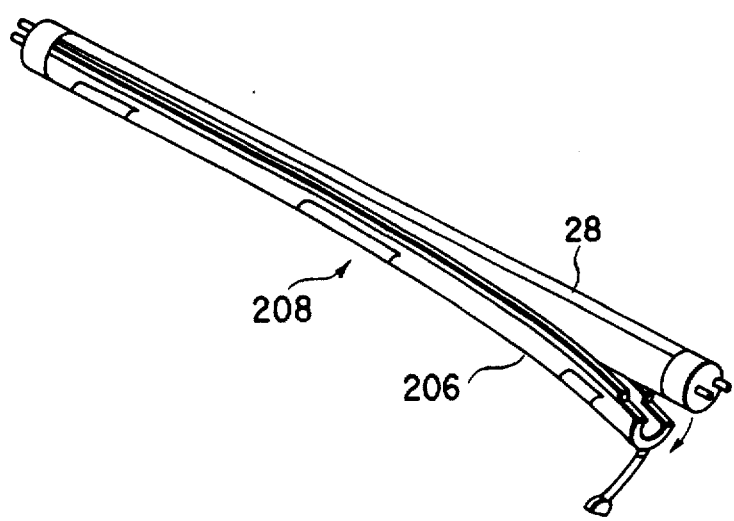
F I G. 3

| TEMPE-RATURE (°C) | A/D CONVERTED VALUE OF TEMPERATURE SENSOR (SEXADECIMA CODE) | RELEASING TIME (SECOND) |
|---|---|---|
| 55 | 50H | 120 |
| 56 | 51H | 115 |
| ⋮ | ⋮ | ⋮ |
| 199 | 254H | 2 |
| 200 | 255H | 0 |

FIG. 8

| NO. | RELEASE EXECUTION TIME (SECOND) | HEAD ADDRESS OF PREHEAT RELEASE PROGRAM | REMARKS |
|---|---|---|---|
| 0 | 0 | NO. A000 | HEATER LAMP |
| 2 | TIME14 | NO. A100 | EXPOSING LAMP HEATER |
| 3 | TIME15 | NO. A200 | POLYGON MOTOR |

FIG. 9

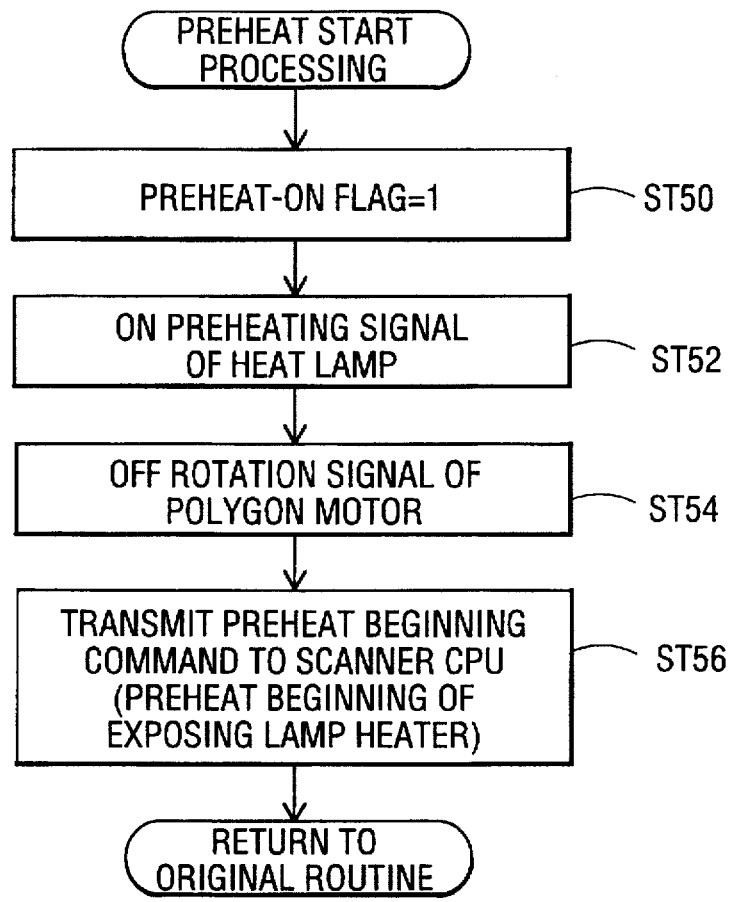
F I G. 11

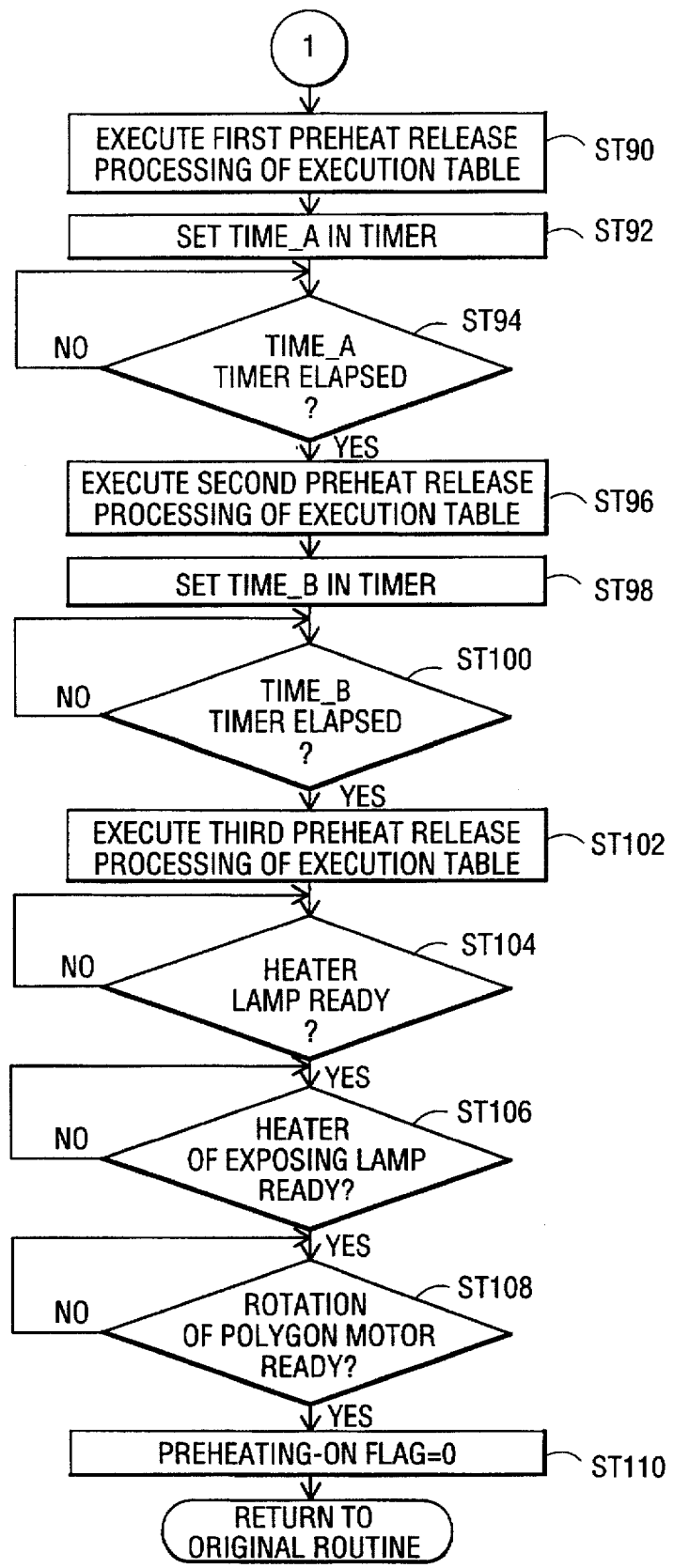
F I G. 12B

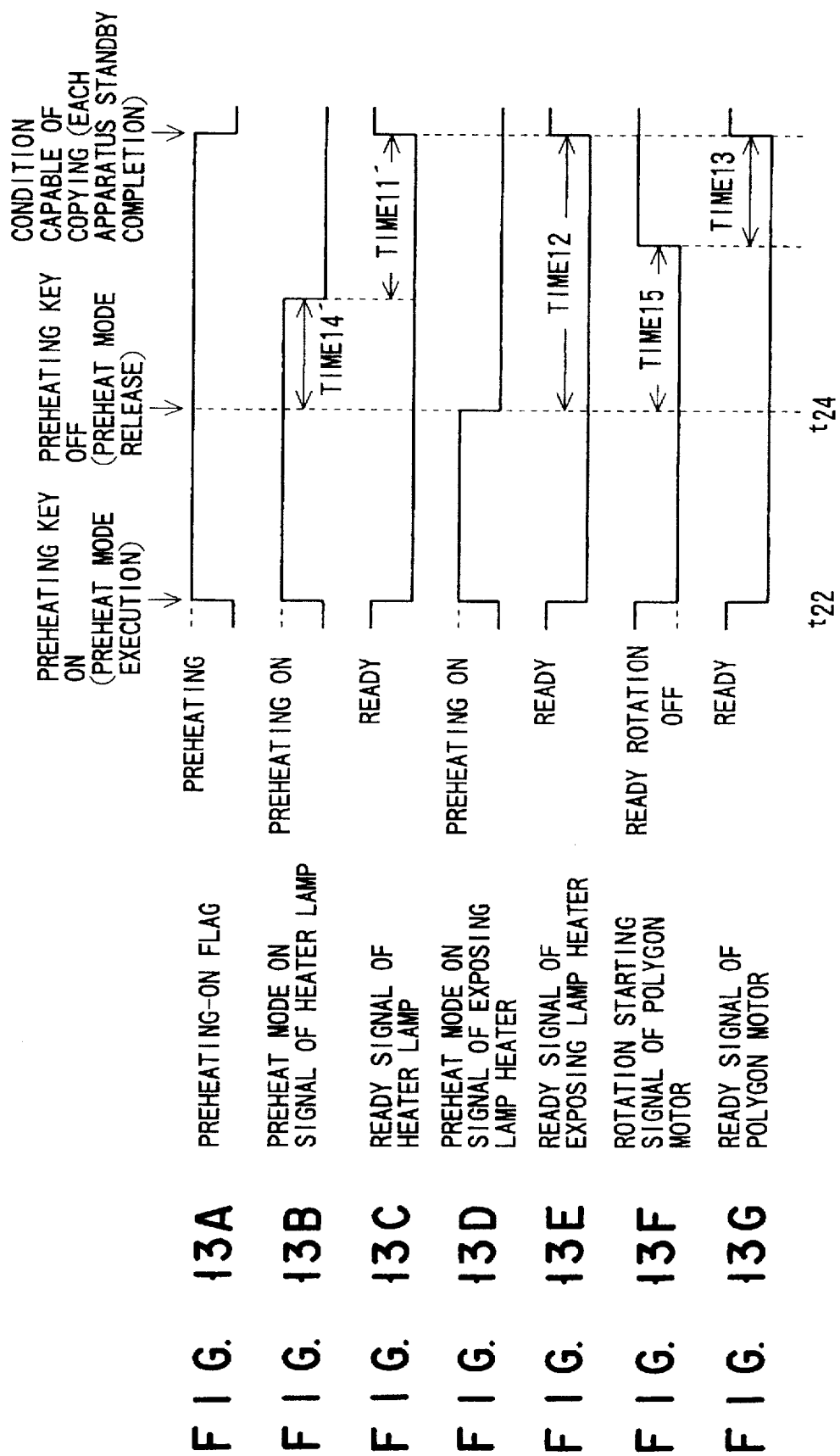

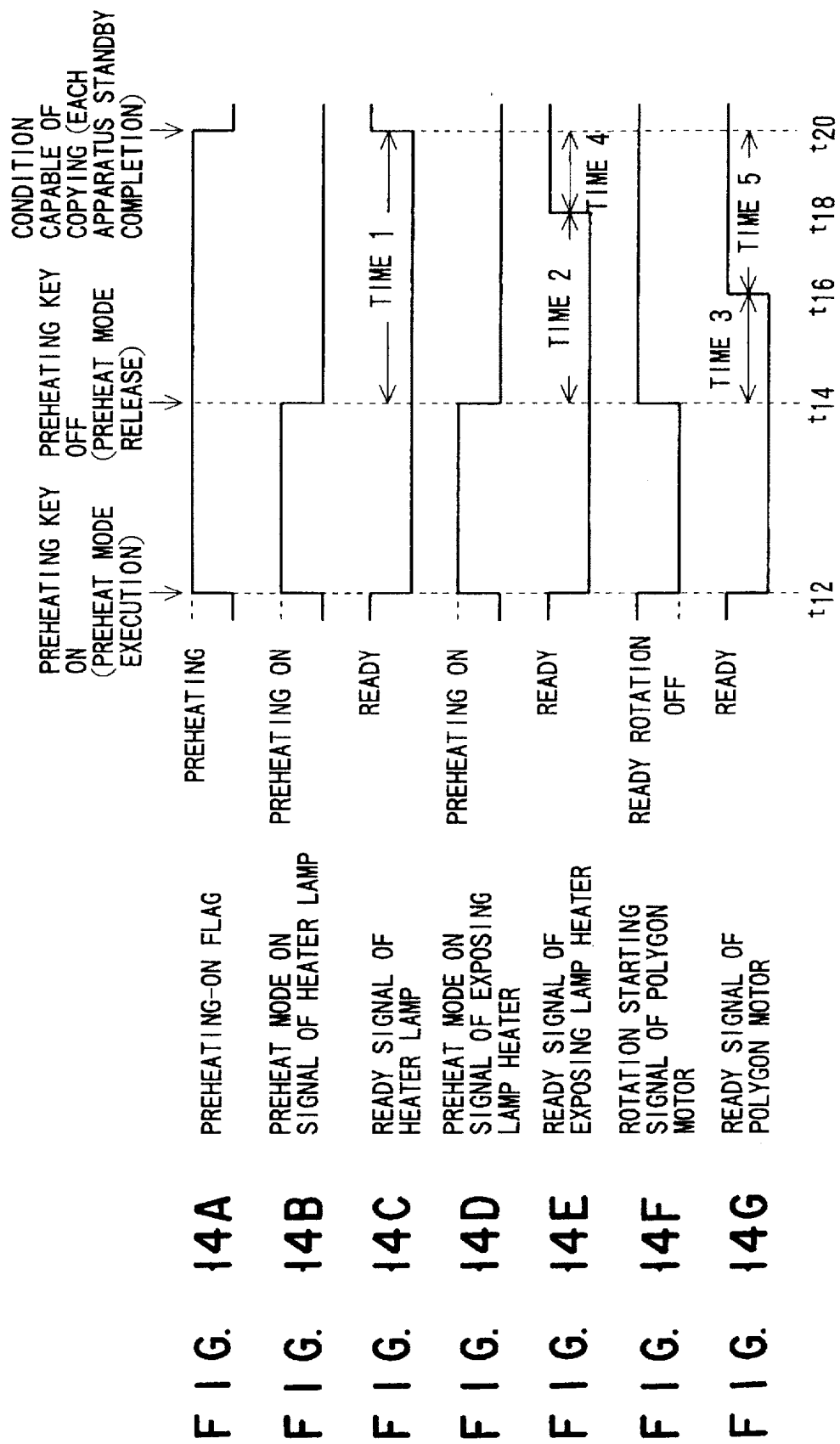

ELECTRICAL APPARATUS HAVING A PLURALITY OF ELEMENTS DIFFERENT IN STARTING PERIOD

BACKGROUND OF THE INVENTION

1. Field of the Invention

The present invention relates to an electrical apparatus having a plurality of elements different in starting period, and more particularly to an electrical apparatus including elements longer in the starting period and bigger in power consumption amount.

2. Description of the Related Art

An image forming apparatus having a fixing apparatus by, for example, heat is provided as an electrical apparatus including elements longer in starting period and bigger in power consumption amount. The image forming apparatus such as a copying machine has a fixing apparatus for pressing at high temperatures (predetermined temperatures) for fixing toner images on paper. The fixing apparatus is composed of a heat roller and a pressing roller. The heat roller is heated to high temperatures by a heater lamp mounted within the heat roller. Although the heater lamp is retained at high temperatures during a copying operation, temperatures can be retained lower than temperatures required by a power-saving function when the copying operation is not carried out. The copying operation can be resumed immediately, without consumption of wasteful electric power, by the use of such a power-saving function.

The above described power-saving function is applicable at the same time not only to the heater lamp, but also to the other apparatuses, to which the power-saving effect is available, such as exposing lamp heater for heating an exposure lamp, and polygon motor for rotatably driving a polygon mirror mounted on a digital copying machine.

The power-saving function of the exposing lamp heater retains the exposure lamp heater at predetermined temperatures during the copying operation as in the case of the heater lamp and retains a temperature lower than the predetermined temperature when the copying operation is not carried out. The power-saving function in the polygon motor supplies a constant rotation driving force for rotating the polygon mirror at a predetermined speed at which the copying operation is not carried out to keep it at a waiting rotation speed lower than that during the copying operation.

When a power-save mode by the power-saving function is carried out, each apparatus as an object of the power-saving function is put under a power-saving condition. When the power-save mode is released for the copying operation, each apparatus in the power-saving condition directs at once at a condition where the copying operation can be carried out, namely, a standby state. Thus, it requires a predetermined constant time before each apparatus completes its standby condition from the releasing of the power-save mode.

The power-save releasing time, namely, time from the power-save mode releasing to the standby completion of the respective apparatuses, is different. The copying capable condition is not provided as an overall copying machine before the other apparatuses is completed in standby if a certain apparatus is completed in standby. The different in the power-save releasing time among the respective apparatuses is time when power is wasted.

The above described contents will be described concretely with reference to FIGS. 14A through 14G. FIGS. 14A through 14G are time charts for explaining the conventional power-save mode releasing time in a case where the power-saving function is applicable with respect to three apparatuses, namely, a heater lamp for the fixing apparatus, an exposing lamp heater for the exposure lamp, and a polygon motor.

The copying machine has a power-saving key for instructing the execution and releasing of the power-save mode. At the execution (t12) of the power-save mode in which the power-saving key is turned on in a condition where a power supply switch is turned on, the level of the power-saving ON signal of the heater lamp becomes 1, the level of the power-saving ON signal of the exposing lamp heater becomes 1, and the level of the rotation starting signal of the polygon motor becomes 0. The ready signal of each apparatus, namely, the ready signal of the heater lamp, the ready signal of the exposing lamp heater, and the ready signal of the polygon motor becomes 0 in level, thus resulting in the power-saving condition of each apparatus (the polygon motor stops).

When the power-saving key is turned off, the power-save mode is released (t14), the level of the power-save mode ON signal of the heater lamp becomes 0, the level of the power-save mode ON signal of the exposing lamp heater becomes 0 and the level of the rotation starting signal of the polygon motor becomes 1, so that thus each apparatus starts the preparation of the standby (at this time, each apparatus is still in the power-saving condition). The heater lamp and the exposing lamp are kept on until the predetermined temperature is provided, and the polygon motor is turned on, so that the speed is accelerated for a predetermined rotation driving speed.

The polygon motor becomes a predetermined rated rotation speed after the lapse of TIME 3 after the releasing of the power-save mode (t14). The level of the ready signal of the polygon moor becomes 1 and the standby of the polygon motor is completed (t16). When the exposing lamp heater reaches the predetermined temperature after the lapse of TIME 2 from the releasing of the power-save mode (t14), the level of the ready signal of the exposing lamp heater becomes 1, and the standby of the exposing lamp heater is completed (t18). When the heat roller reaches a predetermined temperature after the lapse of the TIME 1 after the releasing of the power-save mode (t14), the level of the ready signal of the heater lamp becomes 1, and the standby of the heater lamp is completed (t20).

The condition capable of copying is provided after the standby completion of all the apparatuses from the releasing (t14) of the power-save mode. All the apparatuses are brought into standby at a time when the heater lamp becomes its standby, where time is required most in time to the standby after the lapse of the TIME 1. Namely, the standby condition of the other apparatuses, before the heater lamp becomes standby at the t20, namely, the power to be consumed at TIME 4 and TIME 5 is wasted.

The difference in the power-save releasing time among the respective apparatuses becomes the cause of the power to be wasted. The difference in the power-save releasing time becomes considerable if more, thus resulting in wasting power.

Such a problem is caused likewise, needless to say in the power-save releasing, when the electrical apparatus having no power-saving function has a plurality of elements where the time from the power supply switch turned on to the standby condition is different.

SUMMARY OF THE INVENTION

An object of the present invention is to provide an electrical apparatus for controlling to necessary minimum the power consumption in the electrical apparatus especially including elements longer in starting period and bigger in electric consumption amount.

According to one aspect of the present invention, there is provided an electrical apparatus comprising:

a first power consumption apparatus requiring a first period from start to standby state;

second power consumption apparatus requiring a second period longer than the first period from the start to the standby state;

means for instructing at the same time for the start of the first and second power consumption apparatuses; and means for controlling the second power consumption apparatus to start earlier by a predetermined time than the first power consumption apparatus in accordance with the instruction of the instructing means, thereby bringing the first and second power consumption apparatuses to the standby states within a period shorter than a difference between the first period and the second period.

According to another aspect of the invention, there is provided an image forming apparatus having first operating means requiring time t1 from start to standby, second operating means for requiring time t2 larger than time t1 from start to the standby state for forming images on an image carrier through cooperation with the first and second operating means, comprising:

means for instructing start of the image forming apparatus;

means for controlling the second operating means to start in accordance with the instruction of the instructing means to bring the first operating means and the second operating means to the standby states within a period shorter than a difference between the time t1 and the time t2.

According to another aspect of the invention, there is provided an image forming apparatus, comprising:

means for obtaining image information;

means for forming an electrostatic latent image on an image bearing member corresponding to the image information obtained by the image information obtaining means;

means for developing the electrostatic latent image formed on the image bearing means by a toner to visualize the electrostatic latent image as a toner image;

means for transferring on a paper sheet the toner image;

means for fixing on the paper sheet the toner image transferred by the transferring means;

means for controlling the image forming means and the fixing means in a waiting state in which power consumption amount is smaller than a standby state in which image forming operation is ready for execution, and for controlling a start timing of the image forming means and the fixing means so that the image forming means and the fixing means become at a standby state in substantially a same time.

According to another aspect of the invention, there is provided an image forming apparatus comprising:

a light source for illuminating light to an original placed on an original stand, the light source having temperature dependency;

first heater for heating the light source to a predetermined temperature value k1;

first temperature detecting means for detecting the temperature value of the first heater;

means for producing image information of the original by the light from the light source;

means for deflecting in a predetermined direction the light corresponding the image information produced by the image producing means;

means for driving the deflecting means;

means for forming an electrostatic latent image on a photo-sensitive body by an image of the light deflected by the deflecting means;

means for feeding a toner to the electrostatic latent image to form on the photo-sensitive body a visualized image;

means for transferring on a paper sheet the visualized image as a toner image;

means for fixing on the paper sheet the toner image;

second heater for heating the fixing means to a predetermined temperature value k2;

second temperature detecting means for detecting a surface temperature of the fixing means to be heated by the second heater;

means for receiving an instruction of start and release of a power-save mode;

means for recording first data representing a required time period from restarting to standby state at which the temperature reaches at the value k1 by the instruction of the release of the power-save mode when the first heater is at a given temperature value, and second data representing a required time period from restarting to standby state at which the temperature reaches at the value k2 of the second heater by the instruction of the release of the power-save mode;

power-save mode start controlling means for retaining the first heater at the temperature value k3 lower than the temperature value k1 and retaining the second heater at the temperature value k4 lower than the temperature value k2 when the instruction of the start of the power-save mode has been received by the power-save mode instruction receiving means;

means for starting the detection of the temperature value of the first heater and the fixing means by the first and second temperature detecting means when the restart for releasing the power-save mode by the power-save mode instruction receiving means has been instructed in the condition of the power-save mode;

means for calculating from the first and second data, based on the temperature value of the first heater and the fixing means detected by the detection start controlling means, a required time t1 from the restart of the first heater to the arriving to the t1 temperature value k1, a required time t2 from the restarting of the second heater to the arriving at the temperature value k2 of the fixing means, and a time difference t3 between the time t1 and time t2; and power-save mode release controlling means for controlling the timing so that the second heater of the required time t2 is started after lapse of the time difference t3 after the first heater of the required time t1 is started so that the standby states of the first heater and the fixing means is established approximately at the same time.

According to another aspect of the invention, there is provided an image forming apparatus comprising:

a light source for illuminating light to an original placed on an original stand, the light source having temperature dependency;

means for producing image information of the original by the light from the light source;

means for deflecting in a predetermined direction the light corresponding to the image information produced by the image producing means;

means for driving the deflecting means;

first temperature detecting means for detecting a temperature value on a the surface of the driving means;

means for forming an electrostatic latent image on a photo-sensitive body by the light deflected by the deflecting means;

means for feeding a toner to electrostatic latent images to form on the photo-sensitive body a for visualized image;

means for transferring on a paper sheet the visualized image as a toner image;

means for fixing on the paper sheet the toner image;

a heater for heating the fixing means to a predetermined temperature value k2;

second temperature detecting means for detecting the surface temperature of the fixing means to be heated by the heater;

means for receiving the instruction of the start and release of a power-save mode;

means for recording first data representing a required time period from restarting to standby state at which the temperature reaches at the value k1 by the instruction of the release of the power-save mode when the heater is at a given temperature value, and second data representing a required time period from restarting to standby state at which the temperature reaches at the value k2 by the indications of the releasing of the power-save mode;

power-save mode start controlling means for retaining the heater at the temperature value k3 of the heater lower than the temperature value k1 to stop the driving of the driving means when the instruction of the beginning of the power-save mode has been received by the power-save mode instruction receiving means;

means for starting the detection of the temperature value of the heater and the driving means by the first and second temperature detecting means when the restart for releasing the power-save mode by the power-save mode instruction receiving means has been instructed in the condition of the power-save mode;

means for calculating, based on the temperature value of the heater and the driving means detected by the detection start controlling means, a required time t1, by the first data, from the restarting of the first heater to the arriving at the temperature value k1, and a required time t2, the second data, from the restarting of the driving means from the second data to arriving at the temperature value k2 and a time difference t3 between the time t1 and the time t2; and power-save mode release controlling means for controlling the timing so that the time t2 is restarted after lapse of the time t3 from the restarting of the first heater of the time t1 so that the standby state of the first heater and the driving means is established approximately at the same time.

According to another aspect of the invention, there is provided an image forming apparatus comprising:

a light source for illuminating light to an original placed on an original stand the light source having temperature dependency;

a first heater for heating the light source to a predetermined temperature value k1;

first temperature detecting means for detecting the temperature value of the first heater;

means for producing image information of the original by the light from the light source;

means for deflecting in a predetermined direction the light image corresponding to the image information produced by the image producing means;

means for driving the deflecting means;

second temperature detecting means for detecting a temperature value on the surface of the driving means;

means for forming an electrostatic latent image on a photo-sensitive body by the light image deflected by the deflecting means;

means for feeding a toner to the electrostatic latent image to form on the photo-sensitive body a visual image;

means for transferring on a paper sheet the visual image as a toner image;

means for fixing on the paper sheet the toner image;

second heater for heating the fixing means to a predetermined temperature value k3;

third temperature detecting means for detecting the surface temperature of the fixing means to be heated by the second heater;

means for receiving an instruction of start and release of the power-save mode;

means for recording first data representing a required time period from restarting to standby state at which the temperature reaches at the value k1 by the instruction of the release of the power-save mode when the first heater is at a given temperature value, second data representing a required time from restarting, by the instruction of the releasing of the power-save mode, to standby state at which the temperature reaches at value k2 when the surface of the driving means is at a given temperature value, and third data representing a required time period from the restarting of the second heater by an instruction of the releasing of the power-save mode to arriving at a standby temperature value k3 when the fixing means is at a given temperature value; and power-save mode start controlling means for retaining the first heater at the temperature value k3 lower than temperature value k1, when the instruction of the start of the power-save mode have been instructed by the power-save mode instruction receiving means, to stop the driving of the driving means, and retaining the second heater at the temperature value k5 lower than the temperature value k3;

means for starting the detection of the temperature value of the first heater, the driving means, and the fixing means by the first, second and third temperature detecting means when the restart for releasing the power-save mode by the power-save mode has been instructed by the power-save mode instruction receiving means in the condition of the power-save mode;

means for calculating, on the base of the temperature values of the first heater, the driving means and the fixing means detected by the detection start controlling means, a required time t1, by the first data, from the restarting of the first heater to arriving at the temperature value k1, a required time t2, from the second data, from the restarting of the driving means to arriving at the temperature value k2, and a required time t3, from the third data, from the restarting of the second heater to arriving at the temperature value k3, wherein t1, t2, t3 is longer in order among the required times calculated by the calculating means, t4 is a value reduced by t2 from the t1 and t5 is a value reduced by t3 from t1.

power-save mode release controlling means for controlling the timing so that the t2 equivalent may begin restarting after lapse of t4 after the restart beginning of the t1 equivalent, and the t3 equivalent may begin restarting after lapse of t5 so that the preparation of the first heater, the driving means and the second heater means may be completed approximately at the same time.

According to another aspect of the invention, there is provided a start controlling method comprising the steps of:

retaining a first data wherein required time is recorded from the starting of the first operating means to the standby state, retaining a second data wherein required time is recorded from the starting of the second operating means to the standby state;

obtaining the required time, from the first and second data, to the standby states of the first and second operation means when the starting of the first and second operating means has been instructed; and controlling so that the first and second operating means put into the standby state approximately at the same time.

According to another aspect of the invention, there is provided a method of controlling one of start and restart timing comprising the steps of:

retaining first data wherein required time is recorded from one of starting and the restarting of the first apparatus in an optional condition to the condition where the preparation has been completed;

retaining a second data wherein required time is recorded from the starting or the restarting of the second apparatus in an optional condition to the condition where the preparation has been completed;

detecting the first and second apparatuses when the start or the restart of the first and the second apparatuses has been instructed;

obtaining a required time, from the first and second data, to the completion of the reparation of the first and second apparatuses, on the base of the condition of the detected first and second apparatuses; and controlling the timing of the starting of the start or the restart of the first and second apparatuses.

According to another aspect of the invention, there is provided a method of controlling start or restart timing comprising the steps of:

retaining a first data wherein the required time t1 is recorded from the start or the restart of the first apparatus of an optional value to arriving at the completion of a temperature value where the preparation has been completed, a second data wherein the required time t2 is recorded from the start or the restart of the second apparatus of an optional temperature value to arriving at the completion of the preparation;

detecting the temperature value of the first and second apparatuses when the start or the restart of the first and the second apparatuses has been instructed;

obtaining a required time t3, from the first and second data, to the completion of the preparation of the first and second apparatuses, on the base of the temperature value of the detected first and second apparatuses wherein t1 is longer in time, t2 is shorter in time in order among the required time asked for, and t3 is a value reduced by t2 from t1; and controlling the timing so that the start or the restart of the apparatus corresponding to the t2 may begin after the lapse of t3 from the starting of the start or the restart of the apparatus corresponding to the t1 so that the preparation of the first and the second apparatuses may be completed approximately at the same time.

According to another aspect of the invention, there is provided a method of controlling start or restart comprising the steps of:

retaining a first data wherein the required time is recorded from the restart, when a first apparatus for heating an illuminating means for illuminating lights is at an optional temperature value, to a temperature value k1 where the preparation has been completed;

retaining a second data wherein the required time is recorded from the restart, when the surface of the driving means for driving the deflecting means for deflecting the lights in a predetermined direction is at an optional temperature value, to a temperature value k2 where the preparation has been completed;

retaining a third data wherein the required time is recorded from the restart of the second heater for heating the fixing means, when the fixing means for fixing the toner images on the paper is at an optional temperature value, to a temperature value k3 where the preparation of the fixing means has been completed;

detecting the temperature value of the first heater, the driving means, and the fixing means when the restarting for releasing the power-save mode has been instructed in the condition of the power-save mode where the first heater is retained at the temperature value k4, the driving means is stopped, the fixing means is retained at the temperature value k5;

obtaining the required time t1, by the first data, to the temperature value k1 from the restart of the first heater, the required time t2, by the second data, to the temperature value k2 from the restart of the driving means, the required time t3, by the third data, to the temperature value k3 of the fixing means from the restart of the second heater, wherein t1, t2, t3 is longer in order from among the required time asked for, t4 is a value reduced by t2 from the t1 and t5 is a value reduced by t3 from the t1; and controlling the timing so that the t2 equivalent may begin restarting after the lapse of t4 from the starting of the restart of the t1 equivalent, and the t3 equivalent may begin restarting after the lapse of t5 from.

Since the standby states of the respective apparatuses, namely, of the first heater, second heater and the driving means are established at the same time, or within a period shorter than a difference among the respective standby times of the first and second heaters and of the driving means, it is possible to reduce the consumption of the wasteful power.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a schematic perspective view showing an exposing lamp or the like mounted on a first carriage;

FIG. 3 is a schematic perspective view showing an exposing lamp and exposing lamp heater;

FIG. 8 is a table showing one example of a data table showing the relationship between the temperature of the heat roller and the power-save mode releasing time;

FIG. 9 is a table showing one example of a data table showing the relationship between each apparatus and the power-save mode releasing starting time;

FIG. 11 is a flow chart for illustrating the power-save mode starting process;

FIGS. 12A and 12B are flow charts for illustrating the power-save mode releasing process;

FIGS. 13A through 13G are time charts for illustrating the power-save mode releasing time by the present invention in a case of using two heater lamps; and FIGS. 14A through 14G are time charts for illustrating the conventional power-save mode releasing time.

DETAILED DESCRIPTION OF THE PREFERRED EMBODIMENTS

The embodiment of the present invention will be described hereinafter with reference with the drawings.

Figure 1:
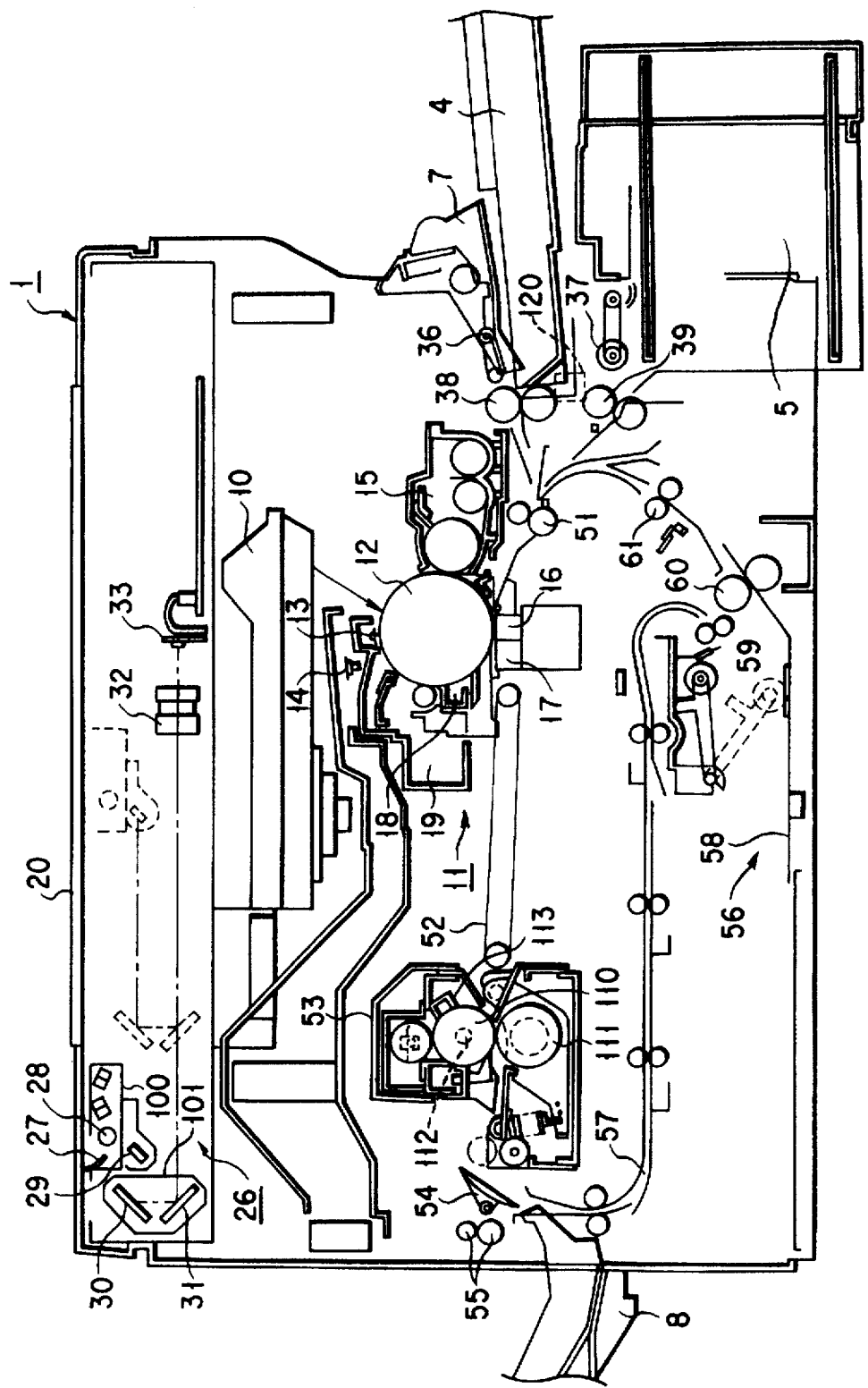
FIG. 1 is a schematic view showing the interior construction of a digital copying machine as an image forming apparatus in one embodiment of the present invention.

FIG. 1 is a schematic view showing the internal construction of the digital copying machine as an image forming apparatus in accordance with one embodiment of the present invention.

An Automatic Document Feeder (ADF) serving as a document cover (not shown) is provided for its free opening, closing operations in the upper portion of the copying machine main body 1. The upper face front portion of the copying machine main body 1 has an operating panel (described later) provided with various operation keys, various displays and so on for instructing the copy conditions and the copy start.

The right side portion of the copying machine main body 1 has a small capacity of paper feeding cassette 4 capable of a small amount of paper and a large capacity of paper feeding cassette 5 capable of accommodating a large amount of paper each being provided respectively for its detachable operation. The small capacity paper feeding cassette 4 is provided with a manual paper feeding stand 7 for feeding paper sheets with a hand. The left side portion of the copying machine main body 1 has a paper discharging tray 8 provided for discharging copied paper.

A printer portion 11 is provided within the copying machine main body 1 for forming images by an image forming process of charging, exposing, developing, transferring, fixing, cleaning and so on. The printer portion 11 has a photo-sensitive body drum 12 which is rotatably supported by a shaft in an approximately central portion within the copying machine main body 1.

A charger 13 for charging use, a LED array 14 for erasing electrostatic latent images formed on the photo-sensitive body drum 12, a magnetic brush type of developing apparatus 15 using two component developer composed of toner and carrier, a charger 16 for image transferring use, a charger 17 for paper separating use, a discharging apparatus 18, a cleaning apparatus 19 are arranged in order around the photo-sensitive body drum 12. The surface of the photo-sensitive body drum 12 is adapted to be charged evenly by the charger 13 for charging use through the clockwise rotation of the photo-sensitive body drum 12.

A document stand 20 composed of transparent glass or the like is provided on the upper face of the copying machine main body 1. The automatic document feeder described above is provided, for its free opening, closing operation, on the document stand 20.

The lower position of the document stand 20 has a scanner portion 26 (optical system) arranged. The scanner portion 26 is composed of an exposing lamp 28 surrounded in its back portion by a reflector 27, reflection mirrors 29, 30 and 31, a lens 32, a CCD sensor 33, and the other optical system. Also, the reflector 27, the exposing lamp 28 and the reflection mirror 29 are mounted on the carriage 100, while the mirrors 30 and 31 are mounted on the carriage 101.

As shown in FIG. 2, a reflector 202 for reflecting the lights from the exposing lamp 28, and a detector 204 for detecting the existence of the document are provided on the first carriage 100. Also, as shown in FIGS. 2 and 3, an exposing lamp heater 206 for heating the exposing lamp 28, a temperature sensor 208 for an exposing lamp heater such as thermistor or the like for detecting the pipe wall temperature of the exposing lamp 28 are provided on the surrounding face of the exposing lamp 28.

Images of the document (not shown) placed on the document stand 20 are optically scanned by a scanner portion 26. The reflection lights from the images of the document are converted into photoelectric signal by the CCD sensor 33 as a photoelectric converting element for converting the image information into image signals. The image signals are outputted from the semiconductor laser to be described later of the laser optical unit 10. The photo-sensitive body drum 12 of the printer portion 11 is exposed so that the electrostatic latent images may be formed on the sensitive body drum 12. The electrostatic latent images formed on the sensitive body drum 12 are developed by a toner as a developer in the magnetic brush of the developer to be fed by the developing apparatus 15 to visualize the images as toner images.

Figure 4:
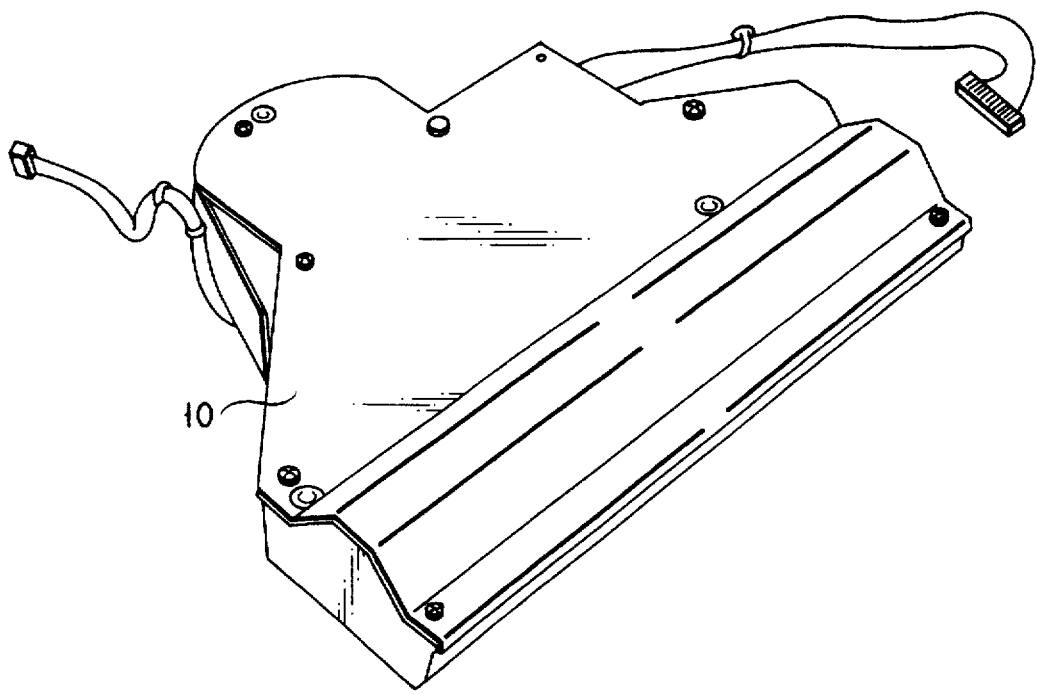
FIG. 4 is a schematic perspective view showing the appearance of a laser optical unit.
Figure 5:
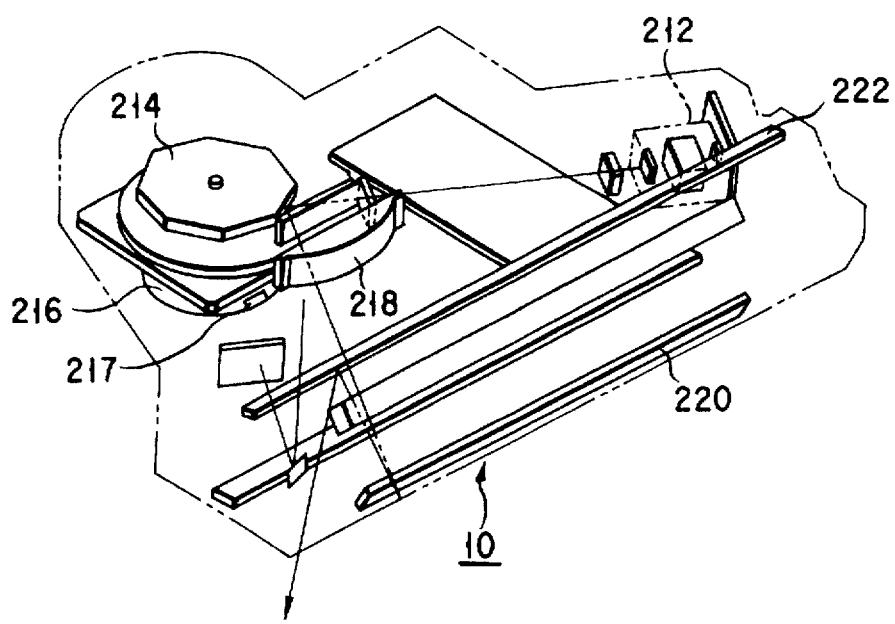
FIG. 5 is a schematic perspective view showing the interior construction of a laser optical unit.

The laser optical unit 10 will be described hereinafter with reference to FIGS. 4 and 5. FIG. 4 is a schematic view showing the appearance of the laser optical unit 10. FIG. 5 is a schematic view of the interior construction of the laser optical unit 10.

The laser optical unit 10 is composed of a semiconductor laser 212 as a light source, a polygon mirror 214 as a scanning member for continuously deflecting the laser lights illuminated from the semiconductor laser 212, a polygon motor 216 for rotating with a predetermined rotation number the polygon mirror 214, a temperature sensor 217 for polygon motor such as thermistor or the like for detecting the wall face temperature of the polygon motor 216, a fθ lens 218 for changing into parallel lights the laser beam for each scanning line from the polygon mirror 214, mirrors 220 and 222 for reflecting parallel lights from the fθ lens 218 to guide them into a position of the exposure position of the sensitive body drum 12. The laser optical unit 10 of such construction is fixed and supported by a support frame (not shown) of the apparatus main body.

The small capacity paper feeding cassette 4 and the large capacity paper feeding cassette 5 are respectively provided detachably in the right side portion of the copying machine main body 1. The paper is adapted to be taken out one by one selectively through pickup rollers 36 and 37, paper feeding rollers 38 and 39 from the small capacity paper feeding cassette 4 and the large capacity paper feeding cassette 5.

A type of the paper feeding cassette, namely, a type of paper size is adapted to be identified by the connecting condition in the connecting portion 120 between the paper feeding cassette and the copying machine main body 1. For example, a plurality of concave portions are provided in the connecting portion 120 on the side of the copying machine main body 1. A plurality of convex portions (pins) corresponding the type of the paper feeding cassette are provided in the connecting portion on the paper feeding cassette side. And the type of the paper feeding cassette is identified by the engagement of the convex portion on the feeding paper cassette side into the concave portion on the copying machine side. Namely, the paper size is adapted to be identified.

The paper taken out from the paper feeding cassette 4 or 5 is guided to a registering roller pair 51. The paper guided by the registering roller pair 51 is carried, guiding into between a charger 16 for transferring use oppositely disposed in the sensitive body drum 12, and the toner images on the sensitive body drum 12 is adapted to be transferred onto the paper by the charger 16 for transferring use.

The paper after its transferring operation is broken away from on the sensitive body drum 12 by the charger 17 for breaking away use by AC corona discharge, is taken in to a fixing apparatus 53 by the heat roller 110 and a press roller 111 through a carrying belt 52 to melt and fix the toner images on the paper by the fixing apparatus 53. The heater lamp 112 for heating the heat roller 110 and a temperature detecting sensor 113 for heat roller such as thermistor or the like for detecting the temperature of the heat roller 110 to be heated by the heater lamp 112 are provided within the heat roller 110.

The paper transferred is discharged from the fixing apparatus 53 and is discharged onto the discharging tray 8 provided externally of the copying machine main body 1 through the paper discharging roller pair 55 by switching a gate 54 provided on the downstream of a fixing apparatus 53. Also, the paper is adapted to be guided into an automatic duplexing device (ADD) 56 provided in the bottom portion within the copying machine main body 1.

Single-face copied paper guided by the ADD 56 is switched back, being carried by an inversion carrying path 57. After the paper is accumulated temporarily into a paper accommodating portion 58 formed in the lower portion of the inversion carrying path 57, the paper is taken out in order from under by the take out roller 59.

The paper taken out by the take out roller 59 from the paper accommodating portion 58 is carried into between the sensitive body drum 12 and the charger 16 for transferring use through the take out roller pair 60, 61 and the register roller pair 51. At this time, the transferred paper is carried so that the uncopied face may come into contact with the sensitive body drum 12. Namely, when the paper copied in its single face passed by way of the ADD 56, the paper is inverted to make the both face possible to copy.

The remaining toner remaining on the sensitive body drum 12 after the transferring of the toner images onto the paper and the paper breaking away operation is cleared away by the cleaning apparatus 18. The surface of the sensitive body drum 12 cleaned by the cleaning apparatus 18 is removed in electricity to a certain potential level or lower by the power removing apparatus 19. Thus, the subsequent copying operation can be made possible.

Figure 6:
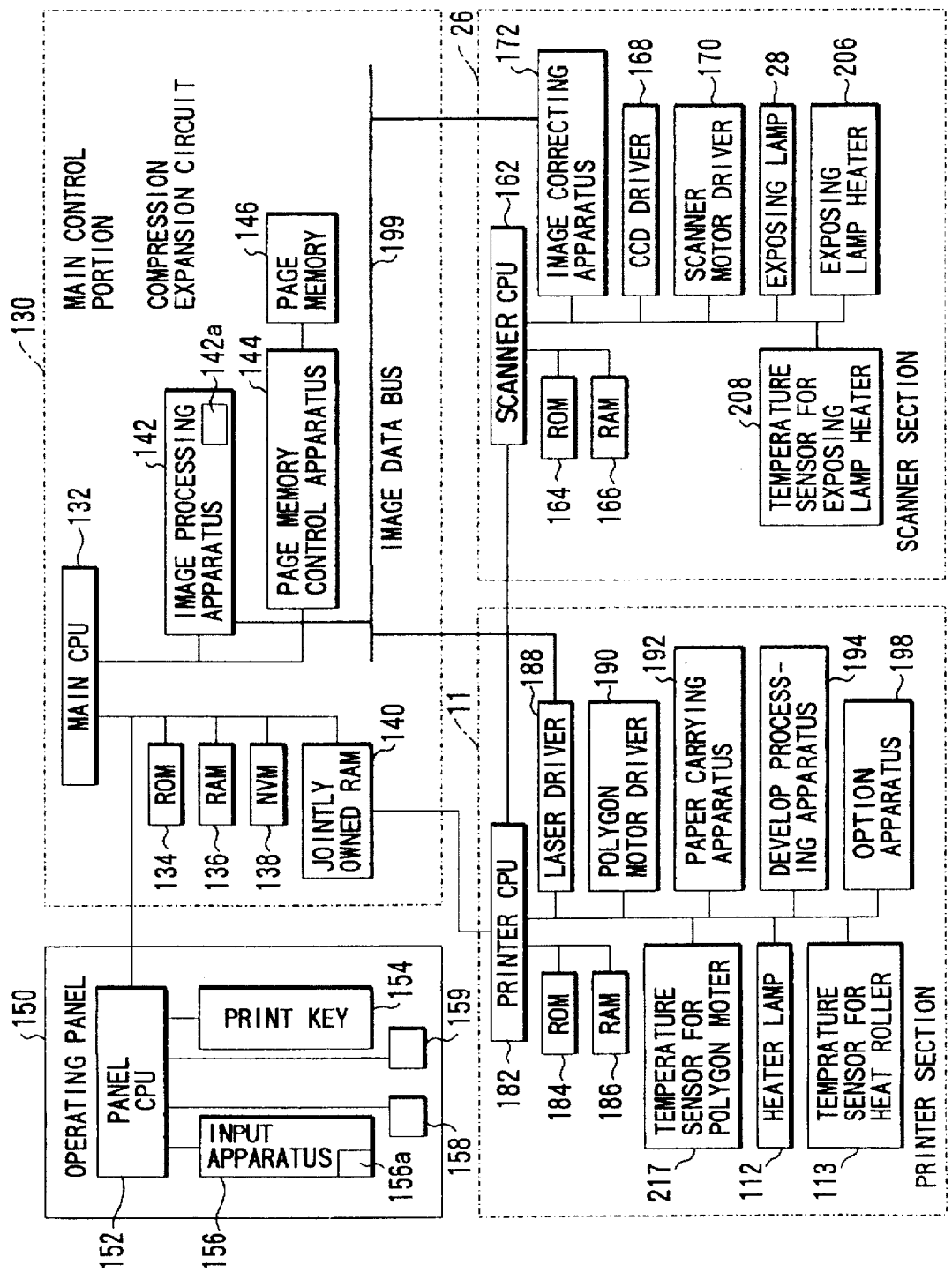
FIG. 6 is a block diagram showing the flow of signals for the electric connection and the control of the digital copying machine of FIG. 1.

FIG. 6 is a schematic block diagram showing showing the flow of the signals for the electric connection and control of the digital copying machine of FIG. 1.

As shown in FIG. 6, the digital copying machine is chiefly composed of four CPUs of a main 132 CPU within the main control portion 130, a panel CPU 152 within the operating panel 150, a scanner CPU 162 of the scanner portion 26, and a printer CPU 182 of the printer portion 11.

A printer key 154 for instructing a copying start, an input apparatus 156 wherein, for example, a plurality of push button switches, a color Braun tube or a transparent touch sensor panel on the image face of a liquid crystal for inputting, conditions for image outputting in the digital copying machine, for example, copying or printing number and magnification, or specification of the partial copying and coordinates of the region, a key 158 to be used for setting of the copying sheet number and the copying magnification, a power-saving key 159 for instructing the execution and the release of the power-save mode, and so on are connected with the panel CPU 152 for controlling the overall operating panel 150.

The input apparatus 156 is provided in accordance with the operating procedure about the digital copying machine or the conditions to be inputted, and a touch sensor as a plurality of input keys where, for example, picture symbols, numerals, letters, letter rows or the like are displayed. For example, they are registration mode keys, sort keys. Also, the input apparatus 156 has a display portion 156a for displaying operation guide or input contents.

A display portion 156a is adapted to display the number of copying sheets, copying magnification, possible copying, memory capacity at sorting, readable document number (estimated) corresponding to the memory capacity, the above illustrated toner empty or the like.

A ROM 134, a RAM 136, a NVM 138, a jointly owned RAM 140, an image processing apparatus 142 and a page memory 146 or the like through a page memory controlling apparatus 144 are connected with the main CPU 132 for controlling the overall main controlling portion 130.

The ROM 134 has a control program memorized. The RAM 136 temporarily has data memories. NVM (nonvolatile RAM) 138 is a nonvolatile memory backed up by a battery (not shown) so that data on the VNM 138 is adapted not to disappear when the current stops.

The jointly owned RAM 140 is used for communication in both directions between the main CPU 132 and a printer CPU 182. The main CPU 132 transmits an operation instructions. The printer CPU 182 executes an operation based on the instructions to return the condition status. The printer CPU 182 and the scanner CPU 162 effects a serial communication. The printer CPU 182 transmits an operation instructions and the scanner CPU 162 executes an operation based on the instructions to return the condition status.

The operating condition of the printer portion 11 and the scanner portion 26 is returned as a status to the main CPU 132. The main CPU 132 normally can grasp the condition of the printer portion 11 and the scanner portion 26. The overall copying machine is controlled by the judgment of the above information and the input contents from the operation panel 150.

The image processing apparatus 142 processes images of trimming, masking or the like, and has, for example, a compressing and extending circuit 142a for compressing or extending the images. The page memory controlling apparatus 144 memories the image data in the page memory 146 or reads it out. The page memory 146 has a region capable of memorizing the image data of a plurality of page portions. The data of the compressed image data from the scanner portion 26 is formed for possible memory for each page.

A ROM 164 with a control program or the like memorized in it, a RAM 166 for data memory, a CCD driver 168 for driving the CCD sensor 33, a scan motor driver 170 for controlling the rotation of the motor for moving a carriage 100 and a carriage 101 or the like, an image correcting apparatus 172, an exposing lamp 28, an exposing lamp heater 206 and a temperature sensor 208 for an exposing lamp heater and so on are connected with the scanner CPU 162 for controlling the overall scanner portion 26.

The image correcting apparatus 172 is composed of an A/D converting circuit for converting into the digital signals the analogue signals from the CCD sensor 33, a shading correcting circuit for correcting the change in threshold level with respect to the output signals from the CCD sensor 334 due to the dispersion of the CCD sensor 33 or the temperature change or the like in surrounding temperature, and a line memory for once memorizing the digital signals corrected in shading from the shading correcting circuit.

The scanner CPU 162 turns on/off the exposing lamp heater 206 so that the wall face temperature of the exposing lamp heater 206 may become a predetermined temperature based on the temperature value to be detected by the temperature sensor 208 for exposing lamp heater. Such a controlling operation retains the exposing lamp heater 206 into a power-saving condition or releases it from the power-saving condition.

A ROM 184 where a control program or the like is memorized, a RAM 186 for data memory, a laser driver 188 for turning on/off the emission by the semiconductor laser 212, a polygon motor driver 190 for controlling the rotation of the polygon motor 216, a temperature sensor 217 for polygon motor for detecting the wall face temperature of the polygon motor, a paper carrying apparatus 192 for controlling the carrying of the paper, a charger 13 for charging use, a developing process apparatus 194 for effecting charging, developing, transferring operations with the use of a charger 13 for charging, a developing apparatus 15, a charter 16 for transferring use, a heater lamp 112, a temperature sensor 113 for heat roller for detecting the surface temperature of the heat roller 110 and an option apparatus 198 and so on are connected with the printer CPU apparatus 182 for controlling the overall printer portion 6.

The printer CPU 182 judges whether or not the standby of the polygon motor 216 has been completed based on the temperature value detected by the temperature sensor 217 for polygon motor, namely, whether or not the rotation speed of the polygon motor has become a predetermined speed. Furthermore, the printer CPU 182 turns on/off the heater lamp 12 based on the temperature value detected by the temperature sensor 113 for heat roller. Such a controlling operation puts the heater lamp 112 into a power-saving condition or releases it from the power-saving condition.

The image processing apparatus 142, the page memory 146, the image correcting apparatus 172 and the laser driver 188 are connected by the image data bus 199.

The ordinary mode processing of the above described digital copying machine will be described hereinafter.

A copying object such as a document or an original (or papers sheets) is placed on an original stand 20. Copying conditions are inputted through the operating panel 150 to turn on the print key 154 so that image information recorded on the document is read out.

Namely, the exposing lamp 28 is lit on through a lamp driver (not shown). The exposing lamp 28, the carriage 100 and the carriage 101 are moved along the document 20 through the rotation of the motor driven by the scan motor driver 170. The reflection lights (namely, image information) from the document are guided in order to the CCD sensor 33.

The reflection lights guided to the CCD sensor 33 are converted into analogue signals in picture units corresponding to resolution of the CCD sensor 33 through the CCD sensor 33 of a condition energized by the CCD driver 168. The analogue signals from the CCD sensor 33 are fed to the image correcting apparatus 172.

The image correcting apparatus 172 converts into digital signals the analogue signals from the CCD sensor 33 to correct in shading the change in the threshold level with respect to the output signals from the CCD sensor 33 due to dispersion of the CCD sensor 33 or change in surrounding temperature. The corrected digital signals are transferred to the paper memory 146 after they are once accommodated.

The digital signals, namely, the image data accommodated in the image correcting apparatus 172 are memorized in the page memory 146 in picture element unit provided for in accordance with the resolution of the CCD sensor 33 for each of one page portion of information in accordance with the control by the main CPU 132.

The picture image information signal memorized by the page memory 146 is read out into the image processing apparatus 142 in accordance with the control by the main CPU 132. The image information signals are processed with, for example, filtering, trimming, masking, mirror image, oblique body, enlarging, contracting, edge emphasis or letter specification or the like and then, are converted into printing signals. The printing signals are outputted in image element unit to the laser driver 188 by way of the printer CPU 182. The image signal outputted to the laser driver 188 turns on/off in picture element unit the laser beams to be outputted from the laser optical unit 10 to be driven.

In the printer portion 11, the motor (not shown) in accordance with the controlling by the main CPU 132 are energized at a time point when the printer key 154 is turned on to rotate the sensitive body drum 12. Desired electric charge is supplied from the charger 13 for charging use to be energized through the developing process apparatus 194 at the same time to the sensitive body drum 12. Also, a recorded material, namely, a copying paper is fed from the cassette or the like through solenoid, clutch or the like to be energized through the paper carrying mechanism 192.

The laser beams turned on/off through the laser driver 188 are illuminated on the surface of the sensitive body drum 12 to which desired charge is fed so that electrostatic latent images are formed on the sensitive body drum 12. The electrostatic latent images are visualized by the toner to be fed through the developing apparatus 15, and are transferred as toner images onto the copying paper through the charger 16 for transferring use.

Toner images transferred on the copying paper are carried to a fixing apparatus 53 through the carrying belt 52 so that they is secured on the paper through a fixing apparatus 53 provided with a heat roller 110 controlled at approximately 200 degrees. The copying paper with toner images being secured onto it is discharged to the discharging tray 8.

In a digital copying machine illustrated above, the control of the power-save releasing time which is a point of the present invention will be described.

The present invention does not cause wasteful consumption power by the proper controlling of the power-saving release timing of the respective apparatus having a power-saving function. Namely, the power-save mode is released in order from an apparatus which takes the longest power-saving releasing time, namely, an apparatus which takes the longest time from the power-saving condition to the standby completion. A controlling operation is effected so that all the apparatuses may be completed in standby at substantially the same time or within a period shorter than differences among respective standby times of the respective elements. Thus, the wasteful consumption power which is caused from the difference in the power-save releasing time can be reduced or prevented.

The above described "it is controlled so that all the apparatuses may become completed in standby at the same time" means that the standby has only to be completed substantially at the same time, with the some errors being allowed, because the object of the present invention is achieved in that the wasteful power consumption can be prevented when the standby is completed approximately at the same time even if the standby completion condition does not agree completely. Needless to say, in the best mode, it is necessary to perfectly make the time point of the standby completion agree with each other.

FIGS. 7A through 7G are time charts for explaining the power-save releasing time in a case when the power-saving function is applied with respect to three apparatuses of the heater lamp 112, the exposing lamp heater 206, and the polygon motor 216.

It is assumed that the relationship among the power-save releasing time TIME 11 of the heater lamp 112, the power-save releasing time TIME 12 of the exposing lamp heater 206, and the power-save releasing time TIME 13 of the polygon motor 216 is TIME 11=TIME 12+TIME 14=TIME 13+TIME 15.

When the power-save mode is carried out (t22) with the power-saving key 159 of the operating panel 150 turned on, the level of the power-saving ON signal of the heater lamp 112 becomes 1, the level of the power-saving ON signal of the exposing lamp heater becomes 1, and the level of the rotation start signal of the polygon motor becomes 0. Namely, the ready signal of each apparatus, namely, the ready signal of the heater lamp, the ready signal of the exposing lamp heater, and the ready signal of the polygon motor become 0 in level with the respective apparatuses becoming power-saving in condition (polygon motor stops).

When the power-save mode releasing is instructed (t24) with the power-saving key 159 turned off, the power-save mode is released in order from apparatuses longest in power-save releasing time to the standby. Namely, at first the level of the power-saving mode ON signal of the heater lamp 112 becomes 0 to release the power-save mode of the heater lamp 112 (t24). When the power-save mode is released, the preparation for the standby of the heater lamp 112 starts. Namely, the heater lamp 112 is turned on before the heat roller becomes a predetermined temperature. For example, the TIME 11 is approximately 90 seconds at longest.

Then, the power-saving key 159 is turned off and the power-save mode releasing is instructed. After the lapse of the TIME 14 (t26), the level of the power-save mode ON signal of the exposing lamp heater 206 becomes 0 to release the power-save mode of the exposing lamp heater 206 (t26). When the power-save mode is released, the preparation of the standby of the exposing lamp heater 206 begins. Namely, the exposing lamp heater 206 is turned on before the exposing lamp heater 206 becomes a predetermined temperature. For example, the TIME 12 is approximately 60 seconds.

After the power-saving key 159 is turned off and the power-save mode releasing is instructed, the level of the rotating start signal of the polygon motor 216 becomes 1 after the lapse of the TIME 15 (t28) to release the power-save mode of the polygon motor (t28). When the power-save mode is released, the preparation of the standby of the polygon motor 216 starts. Namely, the polygon motor 216 is accelerated for a predetermined driving rotation sped. For example, the TIME 13 is approximately 10 seconds. In this embodiment, the polygon motor 216 is stopped in the power-save mode, but the rotation may be effected at a predetermined power-saving speed, rising up to a rated speed with the power-save mode releasing instructions.

The heat roller 110 reaches to a predetermined temperature after the lapse of the TIME 11 after the power-save mode releasing instructions have been predetermined (t24), the level of the ready signal of the heater lamp 112 becomes 1 to complete the standby of the heater lamp 112 (t30).

The exposing lamp heater 206 reaches to a predetermined temperature after the lapse of the TIME 14+TIME 12 after the power-save mode releasing instructions has been predetermined (t24), the level of the ready signal of the exposing lamp heater 206 becomes 1 to complete the standby of the exposing lamp heater 206 (t30).

Furthermore, the polygon motor 216 reaches to a predetermined rotation driving speed after the lapse of TIME 15+TIME 13 after the power-save mode releasing instructions have been predetermined (t24), the level of the ready signal of the polygon motor 216 becomes 1 to complete the standby of the polygon motor 216 (t30).

Namely, the respective apparatuses become the standby completion approximately at the same time (t30), thus making it possible to effect the copying operation. Therefore, the wasteful power is not consumed of the difference in the power-save releasing time among the respective apparatuses as at the conventional power-saving release time. The effect is considerable when more difference in the power-save releasing time exists among the respective apparatuses.

The above described power-save releasing control will be described hereinafter in further detail.

Firstly, a switching control to the power-save mode will be described.

The power-save mode and the power-save mode releasing are effected by a power-saving key 159. When the power-saving key is turned on, the instructions of the power-save mode are sent to the main CPU 132 from the panel CPU 152. And "power-saving start command" is transmitted to the printer CPU 182 from the main CPU 132.

Figure 7:
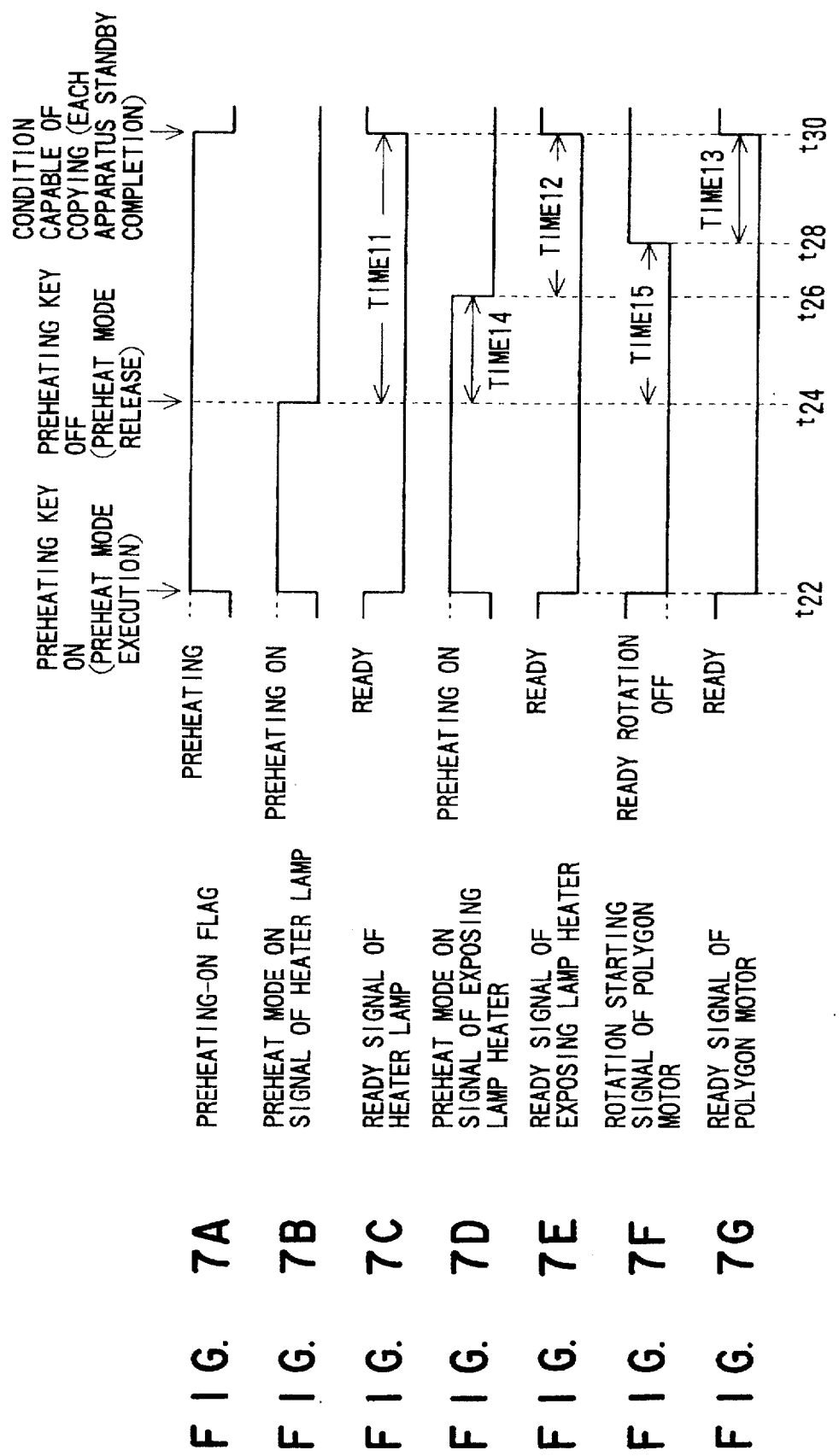
FIGS. 7A through 7G are time charts for illustrating the power-save mode releasing time by the invention.

When the "power-saving start command" is received in the printer CPU 182, the level of a power-saving operation-on flag shown in FIG. 7A becomes 1 to convey the condition change to the main CPU 132. At this time, the level of the power-saving ON signal of the heater lamp 112 (FIG. 7B) and the polygon motor 216 to be controlled by the printer CPU 182 becomes 1, and the level of the ready signal of the heater lamp 112 and the polygon motor 216 becomes 0 as shown in FIGS. 7C and 7G, and the heater lamp 112 and the polygon motor 216 are in a power-saving condition (polygon motor is stopped).

The "power-saving start command" is supplied to the scanner CPU 162 from the printer CPU 182. When the "power-saving start command" is received in the scanner CPU 162, the level of the power-save mode signal of the exposing lamp heater 206 to be controlled by the scanner CPU 182 becomes 1 as shown in FIGS. 7D and 7E, and the signal level of the ready signal of the exposing lamp heater 206 becomes 0 to put the exposing lamp heater 206 into the power-saving condition.

When the power-saving key 159 is turned off, the power-save mode releasing is predetermined to the main CPU 132 from the panel CPU 152. And the "power-save releasing command" is transmitted to the printer CPU 182 from the main CPU 132. When the "power-save releasing command" is received in the printer CPU 182, the "power-saving releasing command" is conveyed to the main CPU 132 with reference to the power-saving-on flag.

When the "power-save releasing command" is received in the printer CPU 182, the level of the power-saving ON signal of the heater lamp 112 and the polygon motor 216 to be controlled by the printer CPU 182 becomes 0 at a predetermined timing considering the difference of the power-save releasing time of respective apparatus, and the heater lamp 112 and the polygon motor 216 is turned on.

Furthermore, the "power-save releasing command" is issued to the scanner CPU 162 from the printer CPU 182. When the "power-save releasing command" is received in the scanner CPU 162, the level of the power-saving signal of the exposing lamp heater 206 to be controlled by the scanner CPU 182 becomes 0 and the exposing lamp heater 206 is turned on. When the standby of the exposing lamp heater 206 is completed, the condition is transmitted to the printer CPU 182.

When the standby of all the apparatuses is completed, the signal level of the power-saving-on flag becomes 0 to transmit the condition to the main CPU 132.

Secondly, the power-save releasing control will be described in detail.

When the power-saving key 159 is turned off and the power-save releasing instructions are predetermined, the power-save releasing time of each apparatus having a power-saving function is asked at the time point. A releasing time of such a power-save mode as each apparatus may be completed in standby approximately at the same time from the power-save releasing time of each apparatus asked, and the releasing of the power-save mode of each apparatus is carried out by the asked timing.

How to ask for the power-save releasing time will be described by way of example of the heater lamp 112. To ask for the power-save releasing time of the heater lamp 112, the data table showing the relationship of the temperature and the power-save releasing time of the heat roller 110 shown in FIG. 8 is memorized in the ROM 134 as the program data. Such a data table is data obtained by experiments or the like in advance. A detection value (A/D converted value) to be detected by the temperature sensor 113 for heat roller is read at a time point when the power-save releasing instructions have been predetermined, the power-save releasing time with respect to the read value is taken out from the data table of FIG. 8.

By such a method, the power-save releasing time of the exposing lamp heater 206, the power-save releasing time (time required to come to a predetermined rotation speed) of the polygon motor 216 is asked.

When the power-save releasing time of each apparatus is asked, the power-save releasing time of each apparatus is compared with to ask for a power-save releasing time which is a maximum value. According to the explanation with reference to FIGS. 7A through 7G, the maximum value becomes TIME MAX=TIME 11 (power-save releasing time of the heater lamp 112). The timing of releasing of the power-save mode is controlled with respect to the apparatus, where the power-save releasing time does not become the maximum value, namely, the exposing lamp heater 206 and the polygon motor 216.

TIME A and TIME B are obtained equivalent to Time 14 and Time 15 when the power-save releasing time of the apparatus, where the power-save releasing time does not become the maximum value, has been reduced from the maximum value of the power-save releasing time. TIME A=TIME MAX–TIME 12 (power-save releasing time of the exposing lamp heater)=TIME 14, TIME B=TIME MAX–TIME 13 (time required for the polygon motor to reach to the predetermined rotation driving speed)=TIME 15 (TIME A<TIME B).

The release executing time (TIME A and TIME B) of the power-save mode asked for in this manner and a head address corresponding table of the program for processing it are made as shown in FIG. 9. And the controlling of the power-save releasing is carried out based on the data table shown in FIG. 9. The time charts when the control of the power-save releasing have been performed based on the data table shown in FIG. 9 are time charts shown in FIGS. 7A through 7G.

Thirdly, the power-save releasing control will be described in detail with reference to the flow charts of FIGS. 10A, 10B through FIGS. 12A, 12B. These flow charts are described with the center of the printer CPU 182.

Figures 10A, 10B:
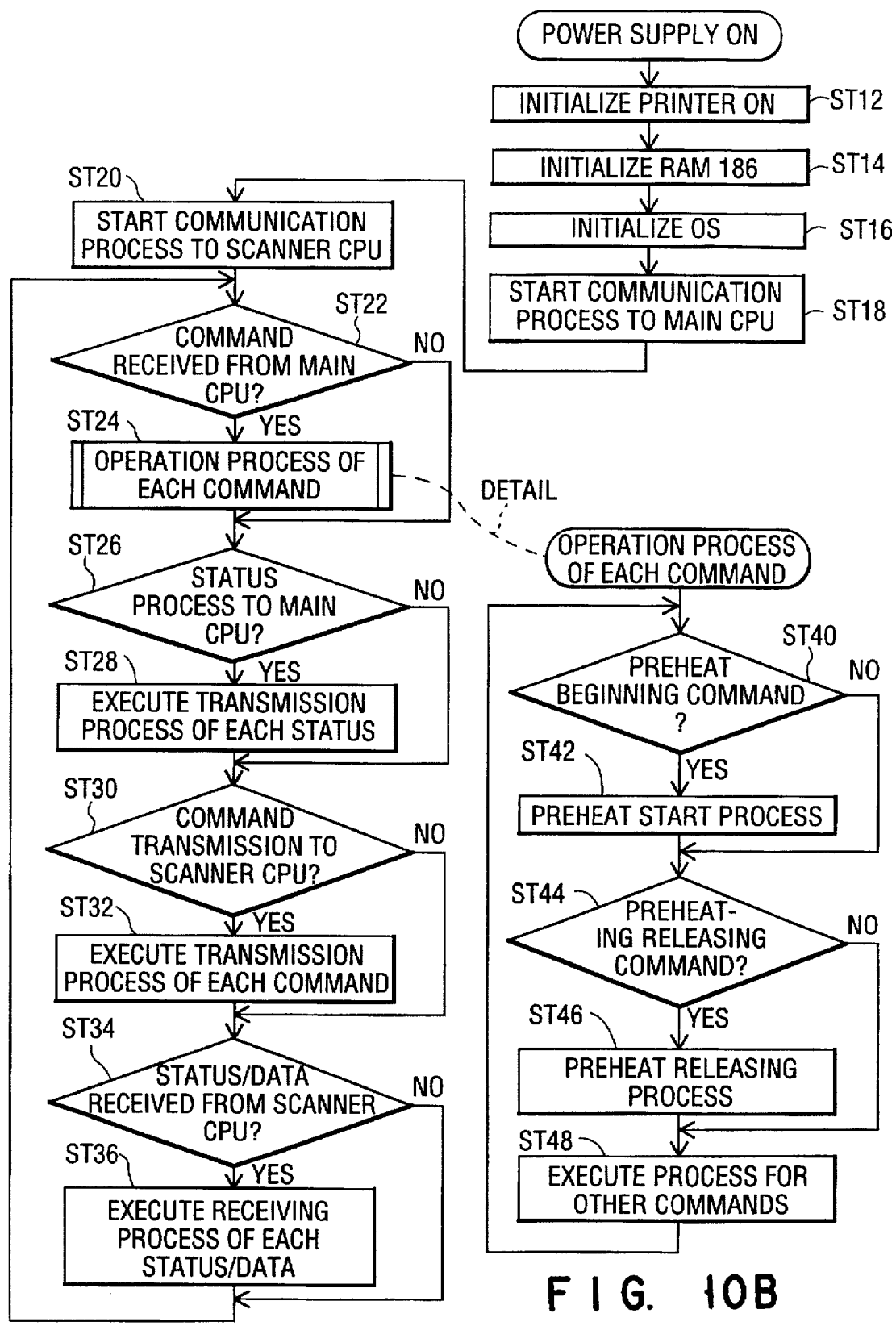
FIGS. 10A and 10B are flow charts for illustrating the execution and releasing of the power-save mode of the present invention.

In FIG. 10A, a power supply is put to work into a copying machine. At ST 12, each CPU, as well as the printer CPU 182, is initialized. At ST 14, each RAM 186 . . . is initialized. Then, OS is initialized at ST 16 and the communication with the main CPU 132 starts at ST 18. Then, the communication with the scanner CPU 162 starts at ST 20.

When at ST 22, a command issued from the main CPU 132 is received in the printer CPU 182, an operation process in accordance with the received command is carried out (ST 24). When the status processing exists with respect to the main CPU 132 (YES at the ST 26), each status is transmitted to the main CPU 132 from the printer CPU 182 (ST28).

When the transmission of some command exits (YES at ST 30) with respect to the scanner CPU 162 from the printer CPU 182, each command is transmitted and processed (ST 32) with respect to the scanner CPU 162. When the status data is received (YES at ST 34) from the scanner CPU 162, the reception processing of the status data is carried out (ST 36).

The operation processing of each command at the ST 24 will be described hereinafter with reference to FIG. 10B.

When the command received at ST 22 is a power-save starting command (YES at ST 40) at ST 22, the power-save start processing is carried out (ST 42). In a case (YES at ST 44) of a power-save releasing command for instructing the restart (here the restart is a form of start, and an operation for releasing the power-save mode) by a command received at the ST 22, the power-save release processing is carried out (ST 46). When the command received at ST 22 is the other command, processing with respect to the other command is carried out ST 48).

The power-save start processing at ST 42 will be described hereinafter with reference to FIG. 11.

A signal level of the power-saving-on flag showing that the power-saving key 159 is turned on into the power-save mode shown in FIG. 7A becomes 1 (ST 50). As shown in FIG. 7B, the signal level of the power-save mode ON signal of the heater lamp 112 becomes 1 (ST 52). The level of the ready signal of the heater lamp 112 as shown in FIG. 7C becomes 0 and the heater lamp 112 is in a power-saving condition.

At the same time, the level of the rotation start signal of the polygon motor 216 becomes 0 as shown in FIG. 7F (ST54), the level of the ready signal of the polygon motor 216 becomes 0 as shown FIG. 7G, thus suspending the rotation of the polygon motor.

Furthermore, the power-save starting command is transmitted even to the scanner CPU 162, the level of the power-save mode ON signal of the exposing lamp heater becomes 1 as shown in FIG. 7D. The level of the ready signal of the exposing lamp heater becomes 0 as shown in FIG. 7E to put the exposing lamp heater 206 into a power-saving condition (ST 56).

Figure 12A:
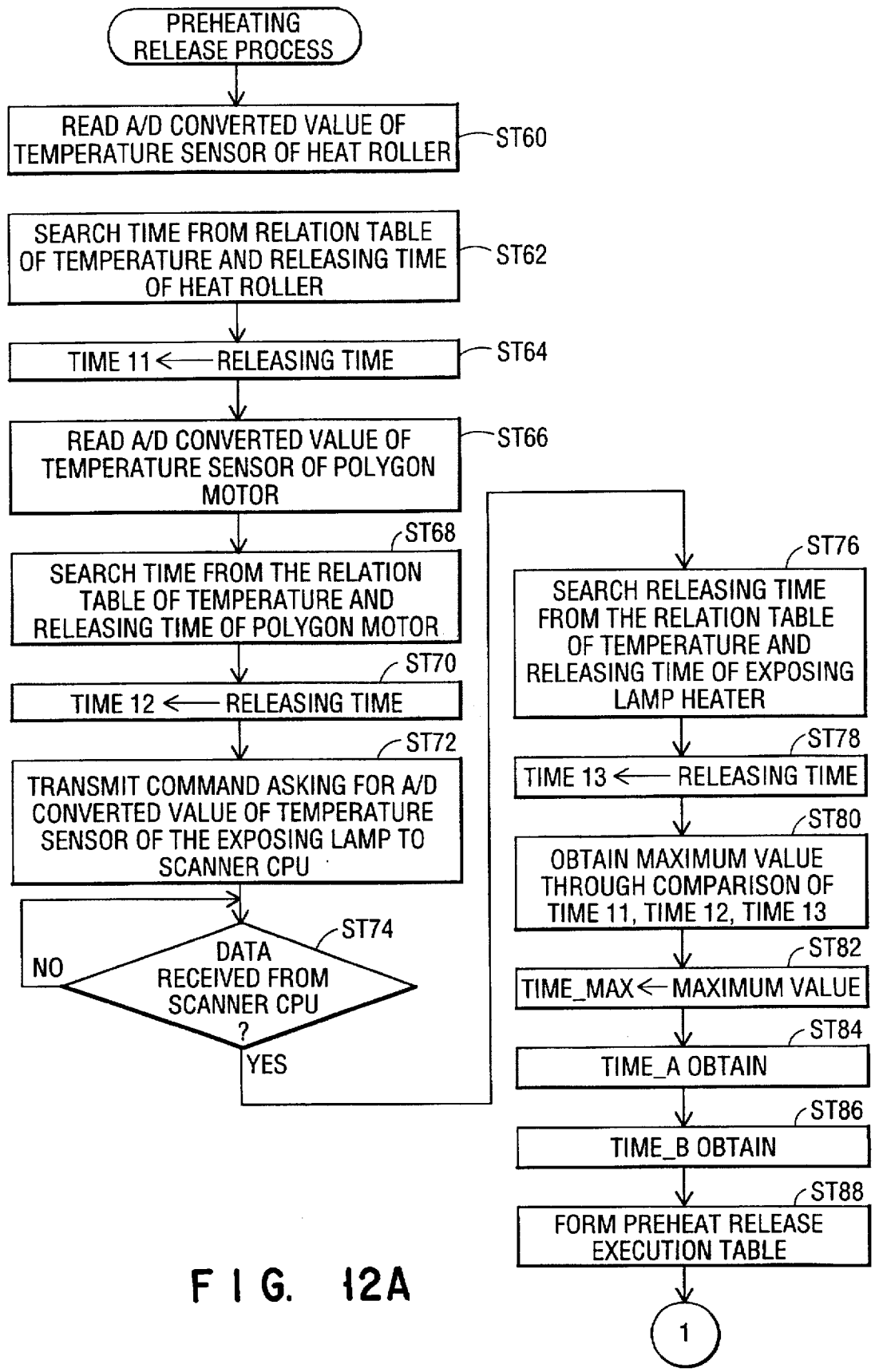

The power-save release processing will be described hereinafter with reference to FIGS. 12A and 12B.

At first, the A/D converted value of the temperature sensor 113 will read out for heat roller (ST 60), the power-save releasing time is searched from the data table showing the relationship between the temperature of the heat roller 110 and the power-save releasing time shown in FIG. 8 (ST 62) to set the power-save releasing time TIME 11 of the heater lamp 112 (ST 64).

Then, the A/D converted value of the temperature sensor 217 for polygon motor is read out (ST 66), and the power-save releasing time is searched from the data table showing the relationship between the temperature of the polygon motor 216 and the the power-save releasing time (ST 68). In this manner, the power-save releasing time TIME 12 of the polygon motor 216 is set (ST 70).

A command demanding the A/D converted value of the temperature sensor 208 for exposing lamp heater with respect to the scanner CPU 162 is transmitted (ST 72), the data from the scanner CPU 162 with respect to the command, namely, the A/D converted value of the temperature sensor 208 for the exposing lamp heater is transmitted (ST 74). The power-save releasing time from the data table showing the relationship of the temperature of the exposing lamp heater 206 and the the power-save releasing time, based on the received data is searched (ST 76), and the power-save releasing time TIME 13 of the exposing lamp heater 206 is set (ST 78).

Then, the power-save releasing time set in the ST 64, ST 70, and ST 78, namely, maximum values compared with the TIME 11, TIME 12, TIME 13 are asked for the maximum value (ST 80), that is, the TIME MAX is set (ST 82). And the TIME A is set (ST 84), the TIME B is set (ST 86) (TIME A<TIME B) and such power-save mode release executing table shown in FIG. 9 is made (ST 88).

Then, in FIG. 12B, a first power-save mode release processing is carried out in the power-save mode release executing table made at the step ST 88.

A timer of the TIME A time is set (ST 92), the power-save mode release processing is carried out of the ST 90. After the lapse of TIME A time (YES at ST 94), a second power-save mode release processing in the power-save mode releasing execution table is carried out (ST 96).

A timer of the TIME B time is set (ST 98), the power-save mode release processing at the ST 90 is carried out. After the lapse of TIME B time (YES at ST 100), a third power-save mode release processing in the power-save mode release executing table is carried out (ST 102).

In this manner, the standby of the heater lamp 112 is completed (ST 104), the standby of the exposing lamp heater 206 is completed (ST 106). When the standby of the polygon motor is completed (ST 108), the signal level of the power-saving-on flag of FIG. 7A becomes 0 (ST 110) into a condition capable of copying operation.

In the above described embodiment, three types, namely, the power-saving control of the heater lamp 112, the exposing lamp heater 206, the polygon motor 216 have been described, with the power-saving control by the present invention being not restricted to them.

Also, in the embodiment, the calculation of the time by the temperature value of the heat roller 110, the exposing lamp heater 206, the polygon motor 216 to the standby completion has been explained, which is not restricted to it. For example, time to the standby completion can be calculated, with time from the execution of the surrounding temperature, the power-save mode being added as the data. Some time is taken to the complete power-saving condition from the power-saving mode execution for the adoption of time from the execution of the power-saving mode as the data.

Furthermore, in the embodiment, the power-saving control has been described, which is not restricted to it. For example, such a controlling operation can be applied to the starting time (where the start does not means the restart for releasing the power-save mode, but the the start from the condition where a copying machine has been stopped completely) of the copying machine. Namely, each apparatus is adapted to be completed in standby approximately at the same time by the earlier starting, at the starting time of the copying machine, of the copying machine which takes time more to the standby.

In the above described embodiment, although the power-save mode signal of the heater lamp is turned off as the same time with the turning off of the power-saving key as shown in FIG. 7B in the case of one heater lamp, the heater lamp may be made, for example, two. As the temperature rise of the heat roller 110 becomes quicker by two heater lamps, the timing for turning off the power-saving mode signal of the heater lamp may be delayed accordingly.

FIGS. 13A through 13G show timing charts for explaining the embodiment where the heater lamps have been made two. For easier understanding, assume that the timing of the on/off of the power-saving key is the same as in a case of FIGS. 7A through 7G, with the exception of two heater lamps, that Time TIME 12, TIME 13 to the standby completion from the power-save mode releasing of the exposing lamp heater 206 and the polygon motor 216 are the same as in FIGS. 7E through 7G.

As the time TIME 11' to the standby completion from the power-save mode releasing in a case of two heater lamps is shorter than the time TIME 12 to the standby completion from the power-saving mode releasing of the exposing lamp heater 206 shown in FIG. 13E as shown in FIG. 13B, the time from the power-save mode releasing of the heater lamp, the exposing lamp heater and the polygon motor to the standby completion becomes the relationship of the TIME 12>TIME 11'>TIME 13. Accordingly, as the longest power-save releasing time is the TIME 12, the power-save releasing time is contracted by TIME 14 as compared with one heater lamp in the case of two heater lamps as clear from the FIGS. 7C and 7D, thus resulting in reduction in effective power consumption amount.

As described hereinabove, an electrical apparatus capable of preventing the wasteful power consumption can be provided without the waiting for the preparation completion of the other apparatuses, because the standby of each apparatus for consuming the power in the standby condition of, for example, a heater lamp, an exposing lamp heater and a polygon motor or the like is completed approximately at the same time or within a period shorter than a difference among respective standby times of the respective elements, after the lapse of shortest time after the releasing of the power-save mode or the working of the power source.

Especially, a power consumption preventing effect appears larger as more difference in the power-save releasing time among the apparatuses which are objects of the power-saving function.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electrical apparatus comprising:
   a first power consumption apparatus requiring a first period from start to standby state;
   second power consumption apparatus requiring a second period longer than the first period from the start to the standby state;
   means for instructing at the same time for the start of the first and second power consumption apparatuses; and
   means for controlling the second power consumption apparatus to start earlier by a predetermined time than the first power consumption apparatus in accordance with the instruction of the instructing means, thereby bringing the first and second power consumption apparatuses to the standby states within a period shorter than a difference between the first period and the second period.

2. An image forming apparatus having first operating means requiring time t1 from start to standby, second operating means for requiring time t2 larger than time t1 from start to the standby state for forming images on an image carrier through cooperation with the first and second operating means, comprising:
   means for instructing start of the image forming apparatus;
   means for controlling the second operating means to start in accordance with the instruction of the instructing means to bring the first operating means and the second operating means to the standby states within a period shorter than a difference between the time t1 and the time t2.

3. An image forming apparatus, comprising:
   means for obtaining image information;
   means for forming an electrostatic latent image on an image bearing member corresponding to the image information obtained by the image information obtaining means;
   means for developing the electrostatic latent image formed on the image bearing means by a toner to visualize the electrostatic latent image as a toner image;
   means for transferring on a paper sheet the toner image;
   means for fixing on the paper sheet the toner image transferred by the transferring means; and
   means for controlling the image forming means and the fixing means in a waiting state in which power consumption amount is smaller than a standby state in which image forming operation is ready for execution, and for controlling a start timing of the image forming means and the fixing means so that the image forming means and the fixing means become at a standby state in substantially a same time.

4. An image forming apparatus comprising:
   a light source for illuminating light to an original placed on an original stand, the light source having temperature dependency;
   first heater for heating the light source to a predetermined temperature value k1;
   first temperature detecting means for detecting the temperature value of the first heater;
   means for producing image information of the original by the light from the light source;
   means for deflecting in a predetermined direction the light corresponding the image information produced by the image producing means;
   means for driving the deflecting means;
   means for forming an electrostatic latent image on a photo-sensitive body by an image of the light deflected by the deflecting means;
   means for feeding a toner to the electrostatic latent image to form on the photo-sensitive body a visualized image;
   means for transferring on a paper sheet the visualized image as a toner image;
   means for fixing on the paper sheet the toner image;
   second heater for heating the fixing means to a predetermined temperature value k2;
   second temperature detecting means for detecting a surface temperature of the fixing means to be heated by the second heater;
   means for receiving an instruction of start and release of a power-save mode;
   means for recording first data representing a required time period from restarting to standby state at which the temperature reaches at the value k1 by the instruction of the release of the power-save mode when the first heater is at a given temperature value, and second data representing a required time period from restarting to standby state at which the temperature reaches at the value k2 of the second heater by the instruction of the release of the power-save mode;
   power-save mode start controlling means for retaining the first heater at the temperature value k3 lower than the temperature value k1 and retaining the second heater at the temperature value k4 lower than the temperature value k2 when the instruction of the start of the power-save mode has been received by the power-save mode instruction receiving means;
   means for starting the detection of the temperature value of the first heater and the fixing means by the first and second temperature detecting means when the restart for releasing the power-save mode by the power-save mode instruction receiving means has been instructed in the condition of the power-save mode;
   means for calculating from the first and second data, based on the temperature value of the first heater and the fixing means detected by the detection start controlling means, a required time t1 from the restart of the first heater to the arriving to the t1 temperature value k1, a required time t2 from the restarting of the second heater to the arriving at the temperature value k2 of the fixing means, and a time difference t3 between the time t1 and time t2; and
   power-save mode release controlling means for controlling the timing so that the second heater of the required time t2 is started after lapse of the time difference t3 after the first heater of the required time t1 is started so that the standby states of the first heater and the fixing means is established approximately at the same time.

5. An image forming apparatus comprising:

a light source for illuminating light to an original placed on an original stand, the light source having temperature dependency;

means for producing image information of the original by the light from the light source;

means for deflecting in a predetermined direction the light corresponding to the image information produced by the image producing means;

means for driving the deflecting means;

first temperature detecting means for detecting a temperature value on the surface of the driving means;

means for forming an electrostatic latent image on a photo-sensitive body by the light deflected by the deflecting means;

means for feeding a toner to electrostatic latent images to form on the photo-sensitive body a for visualized image;

means for transferring on a paper sheet the visualized image as a toner image;

means for fixing on the paper sheet the toner image;

a heater for heating the fixing means to a predetermined temperature value k2;

second temperature detecting means for detecting the surface temperature of the fixing means to be heated by the heater;

means for receiving the instruction of the start and release of a power-save mode;

means for recording first data representing a required time period from restarting to standby state at which the temperature reaches at the value k1 by the instruction of the release of the power-save mode when the heater is at a given temperature value, and second data representing a required time period from restarting to standby state at which the temperature reaches at the value k2 by the indications of the releasing of the power-save mode;

power-save mode start controlling means for retaining the heater at the temperature value k3 of the heater lower than the temperature value k1 to stop the driving of the driving means when the instruction of the beginning of the power-save mode has been received by the power-save mode instruction receiving means;

means for starting the detection of the temperature value of the heater and the driving means by the first and second temperature detecting means when the restart for releasing the power-save mode by the power-save mode instruction receiving means has been instructed in the condition of the power-save mode;

means for calculating, based on the temperature value of the heater and the driving means detected by the detection start controlling means, a required time t1, by the first data, from the restarting of the first heater to the arriving at the temperature value k1, and a required time t2, the second data, from the restarting of the driving means from the second data to arriving at the temperature value k2 and a time difference t3 between the time t1 and the time t2; and power-save mode release controlling means for controlling the timing so that the time t2 is restarted after lapse of the time t3 from the restarting of the first heater of the time t1 so that the standby state of the first heater and the driving means is established approximately at the same time.

6. An image forming apparatus comprising:

a light source for illuminating light to an original placed on an original stand the light source having temperature dependency;

a first heater for heating the light source to a predetermined temperature value k1;

first temperature detecting means for detecting the temperature value of the first heater;

means for producing image information of the original by the light from the light source;

means for deflecting in a predetermined direction the light image corresponding to the image information produced by the image producing means;

means for driving the deflecting means;

second temperature detecting means for detecting a temperature value on the surface of the driving means;

means for forming an electrostatic latent image on a photo-sensitive body by the light image deflected by the deflecting means;

means for feeding a toner to the electrostatic latent image to form on the photo-sensitive body a visual image;

means for transferring on a paper sheet the visual image as a toner image;

means for fixing on the paper sheet the toner image;

second heater for heating the fixing means to a predetermined temperature value k3;

third temperature detecting means for detecting the surface temperature of the fixing means to be heated by the second heater;

means for receiving an instruction of start and release of the power-save mode;

means for recording first data representing a required time period from restarting to standby state at which the temperature reaches at the value k1 by the instruction of the release of the power-save mode when the first heater is at a given temperature value, second data representing a required time from restarting, by the instruction of the releasing of the power-save mode, to standby state at which the temperature reaches at value k2 when the surface of the driving means is at a given temperature value, and third data representing a required time period from the restarting of the second heater by an instruction of the releasing of the power-save mode to arriving at a standby temperature value k3 when the fixing means is at a given temperature value;

power-save mode start controlling means for retaining the first heater at the temperature value k3 lower than temperature value k1, when the instruction of the start of the power-save mode have been instructed by the power-save mode instruction receiving means, to stop the driving of the driving means, and retaining the second heater at the temperature value k5 lower than the temperature value k3;

means for starting the detection of the temperature value of the first heater, the driving means, and the fixing means by the first, second and third temperature detecting means when the restart for releasing the power-save mode by the power-save mode has been instructed by the power-save mode instruction receiving means in the condition of the power-save mode;

means for calculating, on the base of the temperature values of the first heater, the driving means and the fixing means detected by the detection start controlling means, a required time t1, by the first data, from the restarting of the first heater to arriving at the temperature value k1, a required time t2, from the second data, from the restarting of the driving means to arriving at the temperature value k2, and a required time t3, from the third data, from the restarting of the second heater to arriving at the temperature value k3, wherein t1, t2, t3 is longer in order among the required times calculated by the calculating means, t4 is a value reduced by t2 from the t1 and t5 is a value reduced by t3 from t1; and power-save mode release controlling means for controlling the timing so that the t2 equivalent may begin restarting after lapse of t4 after the restart beginning of the t1 equivalent, and the t3 equivalent may begin restarting after lapse of t5 so that the preparation of the first heater, the driving means and the second heater means may be completed approximately at the same time.

7. A start controlling method comprising the steps of:

retaining a first data wherein required time is recorded from the starting of the first operating means to the standby state, retaining a second data wherein required time is recorded from the starting of the second operating means to the standby state;

obtaining the required time, from the first and second data, to the standby states of the first and second operation means when the starting of the first and second operating means has been instructed; and controlling so that the first and second operating means put into the standby state approximately at the same time.

8. A method of controlling one of start and restart timing comprising the steps of:

retaining first data wherein required time is recorded from one of starting and the restarting of the first apparatus in an optional condition to the condition where the preparation has been completed;

retaining a second data wherein required time is recorded from the starting or the restarting of the second apparatus in an optional condition to the condition where the preparation has been completed;

detecting the first and second apparatuses when the start or the restart of the first and the second apparatuses has been instructed;

obtaining a required time, from the first and second data, to the completion of the reparation of the first and second apparatuses, on the base of the condition of the detected first and second apparatuses; and controlling the timing of the starting of the start or the restart of the first and second apparatuses.

9. A method of controlling start or restart timing comprising the steps of:

retaining a first data wherein the required time t1 is recorded from the start or the restart of the first apparatus of an optional value to arriving at the completion of a temperature value where the preparation has been completed, a second data wherein the required time t2 is recorded from the start or the restart of the second apparatus of an optional temperature value to arriving at the completion of the preparation;

detecting the temperature value of the first and second apparatuses when the start or the restart of the first and the second apparatuses has been instructed;

obtaining a required time t3, from the first and second data, to the completion of the preparation of the first and second apparatuses, on the base of the temperature value of the detected first and second apparatuses wherein t1 is longer in time, t2 is shorter in time in order among the required time asked for, and t3 is a value reduced by t2 from t1; and controlling the timing so that the start or the restart of the apparatus corresponding to the t2 may begin after the lapse of t3 from the starting of the start or the restart of the apparatus corresponding to the t1 so that the preparation of the first and the second apparatuses may be completed approximately at the same time.

10. A method of controlling start or restart comprising the steps of:

retaining a first data wherein the required time is recorded from the restart, when a first apparatus for heating an illuminating means for illuminating lights is at an optional temperature value, to a temperature value k1 where the preparation has been completed;

retaining a second data wherein the required time is recorded from the restart, when the surface of the driving means for driving the deflecting means for deflecting the lights in a predetermined direction is at an optional temperature value, to a temperature value k2 where the preparation has been completed;

retaining a third data wherein the required time is recorded from the restart of the second heater for heating the fixing means, when the fixing means for fixing the toner images on the paper is at an optional temperature value, to a temperature value k3 where the preparation of the fixing means has been completed;

detecting the temperature value of the first heater, the driving means, and the fixing means when the restarting for releasing the power-save mode has been instructed in the condition of the power-save mode where the first heater is retained at the temperature value k4, the driving means is stopped, the fixing means is retained at the temperature value k5;

obtaining the required time t1, by the first data, to the temperature value k1 from the restart of the first heater, the required time t2, by the second data, to the temperature value k2 from the restart of the driving means, the required time t3, by the third data, to the temperature value k3 of the fixing means from the restart of the second heater, wherein t1, t2, t3 is longer in order from among the required time asked for, t4 is a value reduced by t2 from the t1 and t5 is a value reduced by t3 from the t1; and controlling the timing so that the t2 equivalent may begin restarting after the lapse of t4 from the starting of the restart of the t1 equivalent, and the t3 equivalent may begin restarting after the lapse of t5 from.

* * * * *